United States Patent
Louh

(10) Patent No.: US 8,323,434 B2
(45) Date of Patent: Dec. 4, 2012

(54) METHOD FOR MANUFACTURING SPHERICAL FRESNEL LENS

(75) Inventor: Sei-Ping Louh, Tu-Cheng (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 272 days.

(21) Appl. No.: 12/685,045

(22) Filed: Jan. 11, 2010

(65) Prior Publication Data
US 2011/0074056 A1    Mar. 31, 2011

(30) Foreign Application Priority Data
Sep. 25, 2009 (CN) .......................... 2009 1 0307686

(51) Int. Cl.
*B29D 11/00* (2006.01)
(52) U.S. Cl. ......... 156/160; 156/196; 156/242; 264/1.1; 264/1.7; 264/2.7
(58) Field of Classification Search .................. 264/1.1, 264/2.7, 1.7; 156/60, 160, 182, 196, 242; 425/808
See application file for complete search history.

(56) References Cited

U.S. PATENT DOCUMENTS
2006/0256452 A1* 11/2006 Lung .............................. 359/742
* cited by examiner

*Primary Examiner* — Mathieu D. Vargot
(74) *Attorney, Agent, or Firm* — Altis Law Group, Inc.

(57) ABSTRACT

Manufacturing spherical Fresnel lens includes providing a first optical element with a regular hexagonal first Fresnel micro-lens in the center of the first optical element and six regular hexagonal second Fresnel micro-lens arrayed around the first Fresnel micro-lens. One edge of the second Fresnel micro-lens is connected to one edge of the first Fresnel micro-lens. The first optical element is stressed to yield a spherical cap configuration of the first optical element, and a second optical element is provided matched to the first optical element, and including a plurality of Fresnel micro-lens. The second optical element is bent into a curve shaped configuration having a curvature as the bent first optical element, and a number of bent second optical elements are assembled around the bent first optical element in sequence to form a hemispherical-shaped configuration.

15 Claims, 6 Drawing Sheets

METHOD FOR MANUFACTURING SPHERICAL FRESNEL LENS

BACKGROUND

1. Technical Field

The present disclosure relates to a method for manufacturing a Fresnel lens and, particularly, to a method for manufacturing a spherical Fresnel lens.

2. Description of Related Art

A plurality of solar cells may be used to supply electrical power in electronic devices. In order to form the solar cells, a spherical Fresnel lens is employed in the solar cell to absorb solar light. The spherical Fresnel lens is a hemisphere-shaped configuration. The spherical Fresnel lens includes a number of Fresnel micro-lenses formed on the spherical surface of the spherical Fresnel lens. The focus of each Fresnel micro-lens is located at the spherical center of the spherical Fresnel lens to focus sunlight onto a solar cell located at the spherical center of the spherical Fresnel lens. However, the spherical Fresnel lens needs a bigger and more complex injection mold to manufacture than that of the flat Fresnel lens because the shape of the spherical Fresnel lens is a spherical configuration.

What is needed, therefore, is a method for manufacturing a spherical Fresnel lens to overcome the above-described problem.

BRIEF DESCRIPTION OF THE DRAWINGS

Many aspects of the present method for manufacturing a spherical Fresnel lens can be better understood with reference to the following drawings. The components in the drawings are not necessarily drawn to scale, the emphasis instead being placed upon clearly illustrating the principles of the method for manufacturing a spherical Fresnel lens.

DETAILED DESCRIPTION

Embodiments of the present disclosure will now be described in detail below, with reference to the accompanying drawings.

Figure 1:
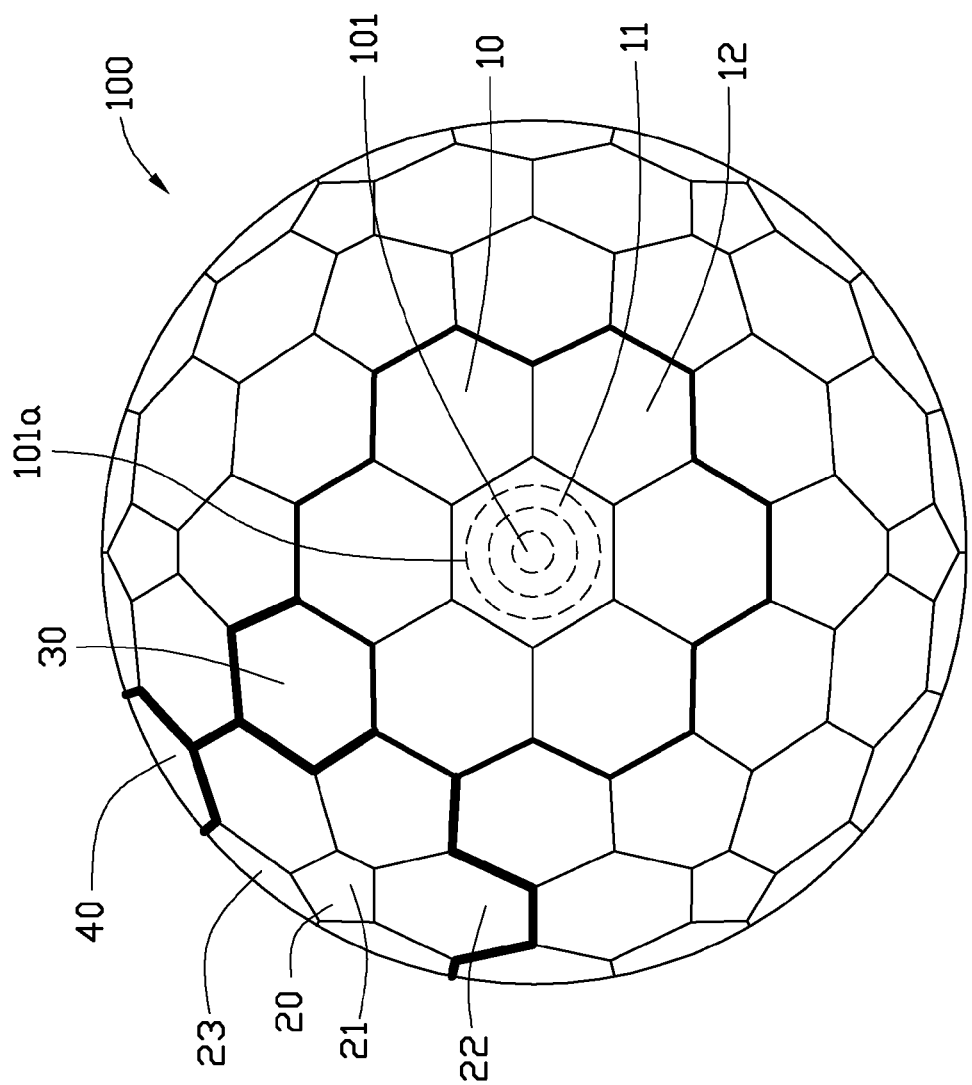
FIG. 1 is a schematic assembled view of a spherical Fresnel lens according to an exemplary embodiment.
Figure 2:
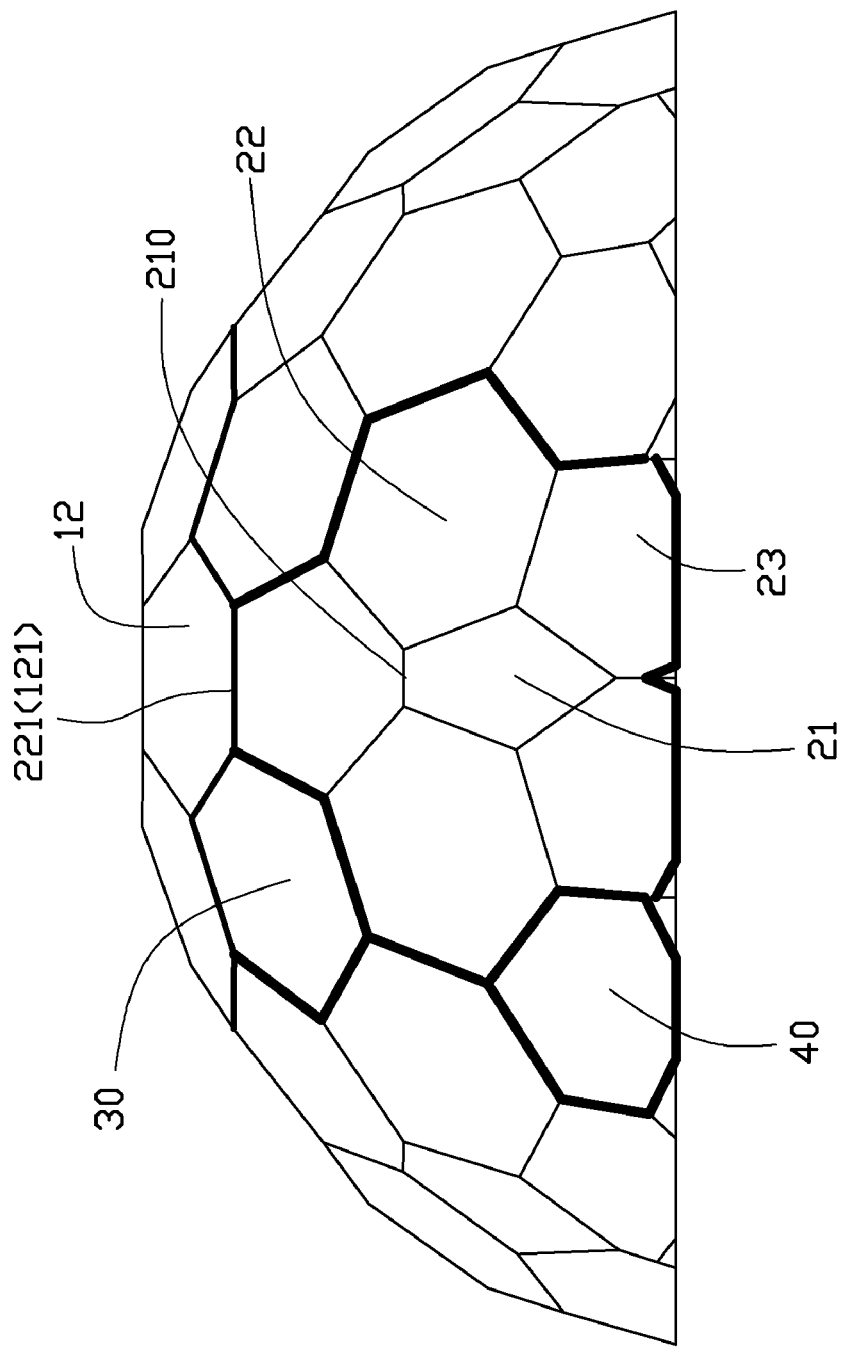
FIG. 2 is a schematic, side view of the spherical Fresnel lens of FIG. 1.

Referring to FIGS. 1 and 2, a spherical Fresnel lens 100 according to an exemplary embodiment, is shown. The spherical Fresnel lens 100 is a hemispherical-shaped configuration. The spherical Fresnel lens 100 includes a first optical element 10, six second optical elements 20, six third optical elements 30, and six fourth optical elements 40. The six second optical elements 20 are arranged around the first optical element 10, and each third optical element 30 is positioned between the first optical element 10 and the second optical element 20. Each fourth optical element 40 is positioned between adjacent second optical elements 20 correspondingly. Each of the first optical element 10, the six second optical elements 20, the six third optical elements 30, and the six fourth optical elements 40 includes at least one polygonal Fresnel micro-lens 101. In the present embodiment, each Fresnel micro-lens 101 includes a number of concentric ring-like facets 101a for focusing light onto a target.

Figure 3:
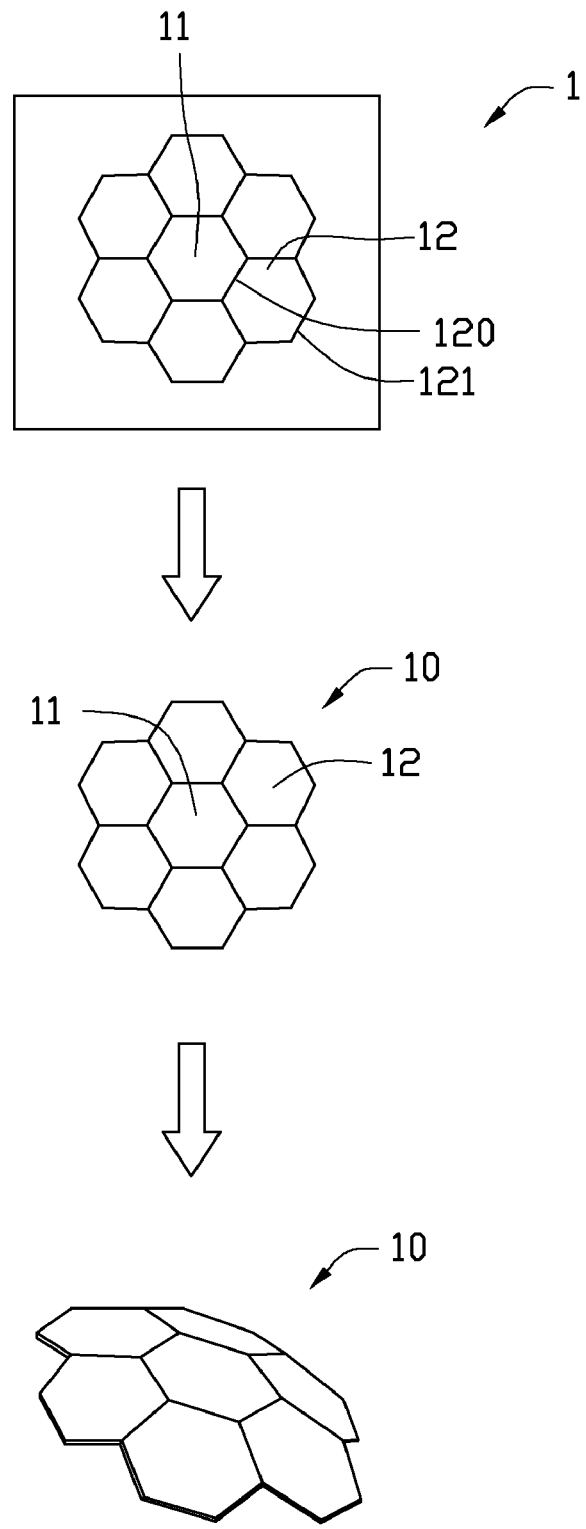
FIG. 3 is a schematic view showing a method for manufacturing a first optical element of the spherical Fresnel lens of FIG. 1.

Referring to FIGS. 1 and 3, the first optical element 10 includes a first Fresnel micro-lens 11 and six second Fresnel micro-lens 12. The first Fresnel micro-lens 11 and second Fresnel micro-lens 12 are a regular hexagonal configuration. The size of the second Fresnel micro-lens 12 is the same to the size of the first Fresnel micro-lens 11. Each second Fresnel micro-lens 12 includes a first edge 120 adjacent to the first Fresnel micro-lens 11 and a second edge 121 opposite to the first edge 120. The first edge 120 of the second Fresnel micro-lens 12 is connected to a corresponding edge of the first Fresnel micro-lens 11.

Figure 4:
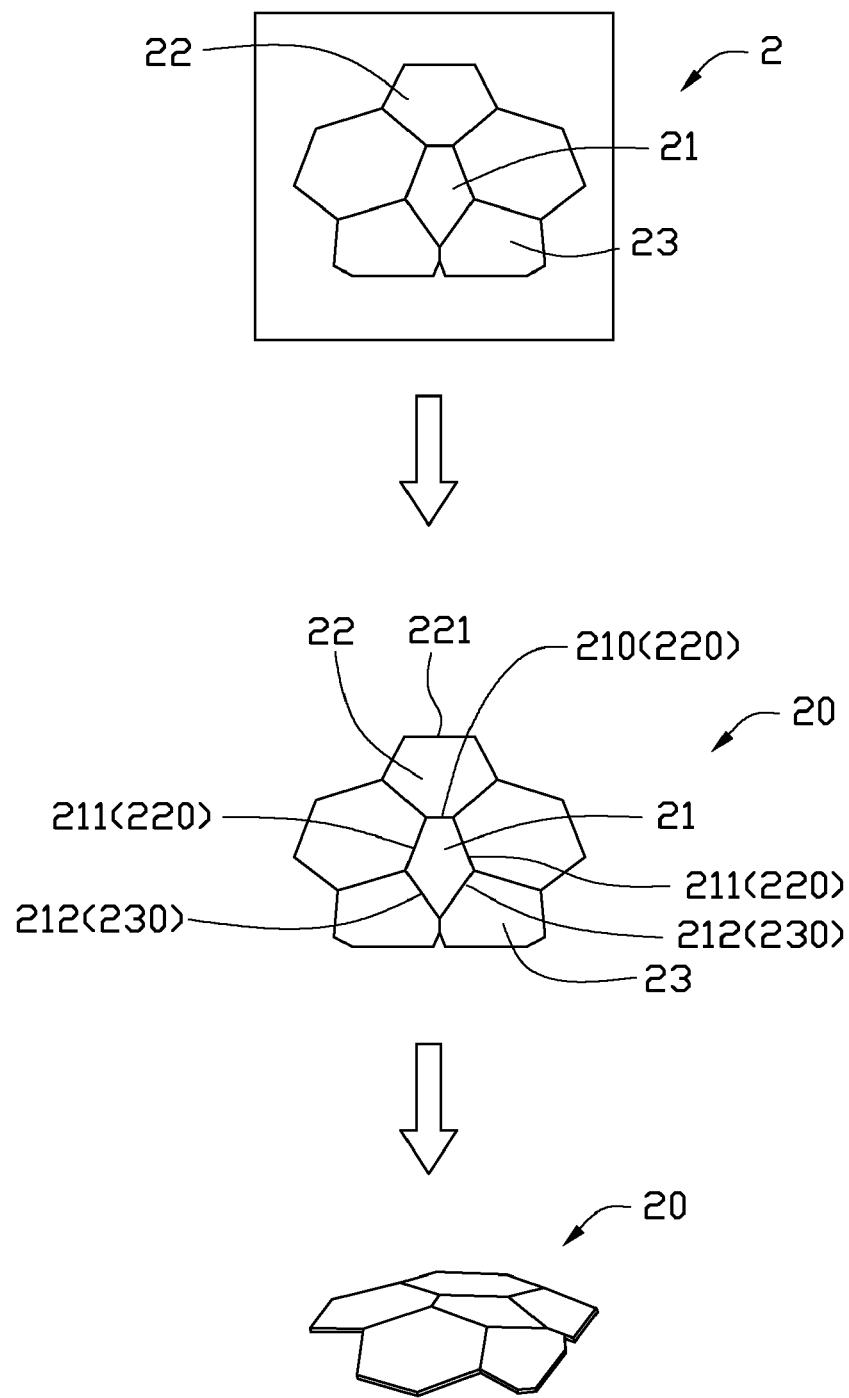
FIG. 4 is a schematic view showing a method for manufacturing a second optical element of the spherical Fresnel lens of FIG. 1.

Referring to FIGS. 2 and 4, the second optical element 20 includes a third Fresnel micro-lens 21, three fourth Fresnel micro-lens 22, and two fifth Fresnel micro-lens 23. The third Fresnel micro-lens 21 is a pentagonal configuration. The fourth Fresnel micro-lens 22 is a hexagonal configuration. The fifth Fresnel micro-lens 23 is a heptagonal configuration. The third Fresnel micro-lens 21 includes a third edge 210, two fourth edges 211, and two fifth edges 212. The fourth edges 211 are connected to the third edge 210 of the third Fresnel micro-lens 21. The fifth edges 212 are connected to the fourth edges 211 of the third Fresnel micro-lens 21. The fourth Fresnel micro-lens 22 includes a sixth edge 220 and a seventh edge 221. The sixth edge 220 is opposite to the sixth edge 220 of the fourth Fresnel micro-lens 22. The seventh edge 221 of the fourth Fresnel micro-lens 22 is connected to the second edge 121 of the first optical element 10 via an adhesive. The sixth edge 220 of one of three fourth Fresnel micro-lenses 22 is connected to the third edge 210 of the third Fresnel micro-lens 21. And the sixth edge 220 of the other two fourth Fresnel micro-lenses 22 are connected to the fourth edge 211 of the third Fresnel micro-lens 21. The fifth Fresnel micro-lens 23 includes an eighth edge 230. The eighth edge 230 of the fifth Fresnel micro-lens 23 is connected to the fifth edge 212 of the third Fresnel micro-lens 21.

Referring to FIG. 2, the shape of the third optical element 30 is regular hexagonal, and the third optical element 30 includes one Fresnel micro-lens. The shape of the fourth optical element 40 is heptagonal, and the fourth optical element 40 includes one Fresnel micro-lens.

Referring to FIGS. 3 to 6, a method for manufacturing the spherical Fresnel lens 100 is shown. The method includes the following steps.

A first sheet 1 with a first optical element 10 formed thereon is provided. In the present embodiment, the first sheet 1 is made from transparent acrylic material, and is manufactured by hot press forming.

Excessive materials around the first optical element 10 are removed from the first sheet 1 to obtain the first optical element 10.

The first optical element 10 is stressed to yield a spherical cap configuration of the first optical element 10.

Referring to FIG. 4, a second sheet 2 with a second optical element 20 formed thereon is provided. In the present embodiment, the material and the forming technology are same to that of the first sheet 1.

The excessive material around the second optical element 20 is removed from the second sheet 2 to obtain the second optical element 20.

The second optical element 20e is bent into a curve shaped configuration.

The second optical element 20e has a curvature as the bent first optical element 10.

Figure 5:
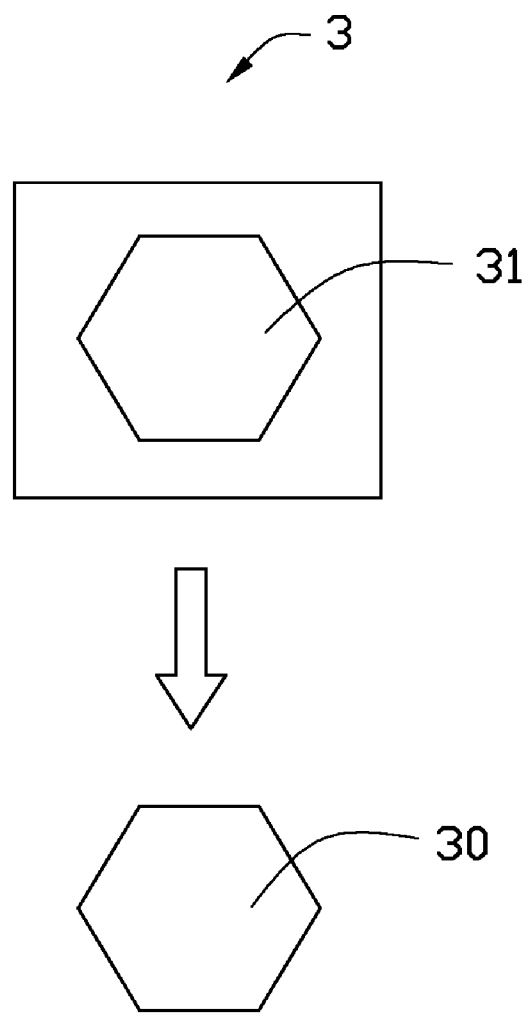
FIG. 5 is a schematic view showing a method for manufacturing a third optical element of the spherical Fresnel lens of FIG. 1.

Referring to FIG. 5, a third sheet 3 with a third optical element 30 formed thereon is provided. In the present embodiment, the material and the forming technology are same as that of the first sheet 1.

Excessive materials around the third optical element 30 is removed from the third sheet 3 to obtain the third optical element 30.

Figure 6:
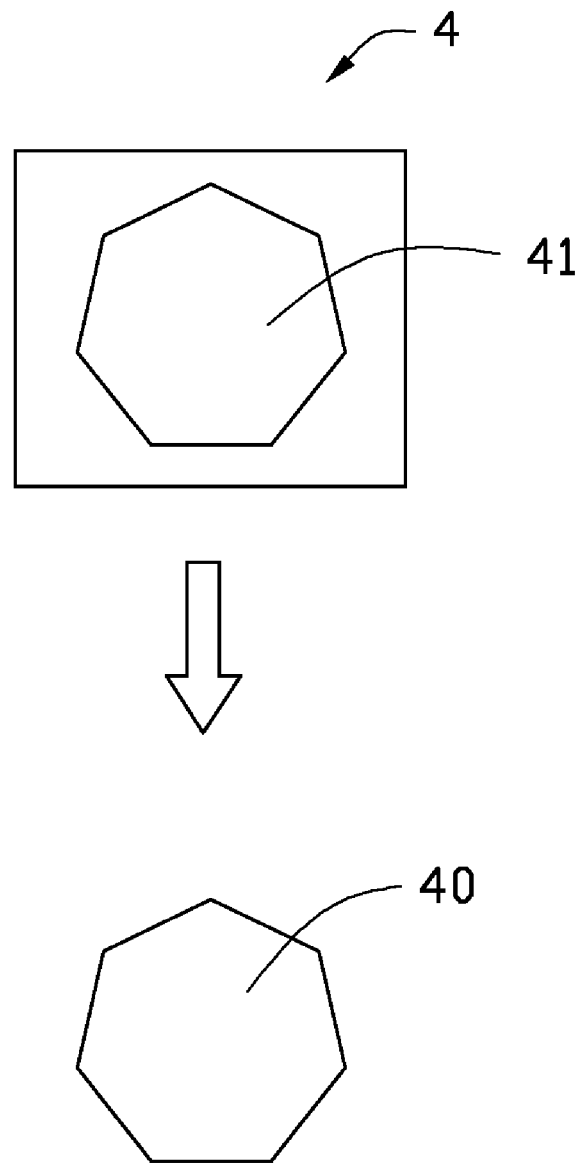
FIG. 6 is a schematic view showing a method for manufacturing a fourth optical element of the spherical Fresnel lens of FIG. 1.

Referring to FIG. 6, a fourth sheet 4 with a fourth optical element 40 formed thereon is provided. In the present embodiment, the material and the forming technology are same as that of the first sheet 1.

Excessive materials around the fourth optical element 40 from the fourth sheet 4 is removed to obtain the fourth optical element 40.

Referring to FIGS. 1 and 2, a number of second optical elements 20 is assembled around the first optical element 10 sequentially to form a hemispherical-shaped configuration, and the third optical elements 30 is positioned between the first optical element 10 and the second optical element 20, the fourth optical element 40 is positioned between the two adjacent second optical elements 20. In the present embodiment, the seventh edge 221 of the second optical element 20 is attached to the second edge 121 of the first optical element 10 via adhesive. The third optical elements 30 is attached between the first optical element 10 and the second optical elements 20 via an adhesive, the fourth optical element 40 is attached between the two adjacent second optical elements 20 via an adhesive.

In an alternative embodiment, the first optical element 10, the second optical element 20, the third optical element 30, and the fourth optical element 40 are formed directly without cutting process. In an alternative embodiment, the third optical element 30 or/and the fourth optical element 40 is integrally formed with the second optical element 20.

While certain embodiments have been described and exemplified above, various other embodiments will be apparent to those skilled in the art from the foregoing disclosure. The present disclosure is not limited to the particular embodiments described and exemplified, and the embodiments are capable of considerable variation and modification without departure from the scope of the appended claims.

What is claimed is:

1. A method for manufacturing spherical Fresnel lens, comprising:
    providing a first optical element comprising a regular hexagonal first Fresnel micro-lens in the center of the first optical element and six regular hexagonal second Fresnel micro-lenses arrayed around the first Fresnel micro-lens, one edge of the second Fresnel micro-lens connected to one edge of the first Fresnel micro-lens;
    stressing the first optical element to yield a spherical cap configuration of the first optical element;
    providing a second optical element matched to the first optical element, the second optical element comprising a pentagonal third Fresnel micro-lens, three hexagonal fourth Fresnel micro-lens, and two heptagonal fifth Fresnel micro-lens, the third Fresnel micro-lens comprising a third edge, two fourth edges connected to the third edge of the third Fresnel micro-lens, and two fifth edges connected to the fourth edges of the third Fresnel micro-lens, the fourth Fresnel micro-lens comprising a sixth edge and a seventh edge opposite to the sixth edge of the fourth Fresnel micro-lens, the sixth edge of the fourth Fresnel micro-lens being connected to the third edge and the fourth edge of the third Fresnel micro-lens respectively, the fifth Fresnel micro-lens comprising a eighth edge, the eighth edge of the fifth Fresnel micro-lens being connected to the fifth edge of the third Fresnel micro-lens;
    bending the second optical element to yield a curve shaped configuration having a curvature as the bent first optical element;
    assembling a number of bent second optical elements around the bent first optical element in sequence by attaching the seventh edge of the fourth Fresnel micro-lens to the edge of the first optical element, to form a hemispherical-shaped configuration.

2. The method for manufacturing spherical Fresnel lens as claimed in claim 1, wherein the providing a first optical element further comprises:
    providing a first sheet with a first optical element formed thereon;
    removing excessive materials around the first optical element from the first sheet to obtain the first optical element.

3. The method for manufacturing spherical Fresnel lens as claimed in claim 1, wherein the providing a second optical element further comprises:
    providing a second sheet with a second optical element formed thereon;
    removing the excessive materials around the second optical element from the second sheet to obtain the second optical element.

4. The method for manufacturing spherical Fresnel lens as claimed in claim 1, wherein each Fresnel micro-lens comprise a plurality of concentric ring-like facets for converging light onto a target.

5. The method for manufacturing spherical Fresnel lens as claimed in claim 1, wherein after assembling the second optical element, the method for manufacturing spherical Fresnel lens further comprises:
    providing a regular hexagonal third optical element and a heptagonal fourth optical element;
    assembling the third optical element between the first optical element and the second optical element, and assembling the fourth optical element between two adjacent second optical elements.

6. The method for manufacturing spherical Fresnel lens as claimed in claim 5, wherein the providing a third optical element further comprises:
    providing a third sheet with the third optical element formed thereon;
    removing excess materials around the third optical element from the third sheet to obtain the third optical element.

7. The method for manufacturing spherical Fresnel lens as claimed in claim 5, wherein the providing a fourth optical element further comprises:
    providing a fourth sheet with the fourth optical element formed thereon;
    removing excess materials around the fourth optical element from the fourth sheet to obtain the fourth optical element.

8. The method for manufacturing spherical Fresnel lens as claimed in claim 5, wherein the third optical element is integrally formed with the second optical element.

9. The method for manufacturing spherical Fresnel lens as claimed in claim 5, wherein the fourth optical element is integrally formed with the second optical element.

10. The method for manufacturing spherical Fresnel lens as claimed in claim 5, wherein the fourth optical element and the third optical element are integrally formed with the second optical element.

11. The method for manufacturing spherical Fresnel lens as claimed in claim 2, wherein the first sheet is made from a transparent acrylic material.

12. The method for manufacturing spherical Fresnel lens as claimed in claim 2, wherein the first sheet is manufactured by a hot press forming method.

13. The method for manufacturing spherical Fresnel lens as claimed in claim 11, wherein the material of the second sheet is same as that of the first sheet.

14. The method for manufacturing spherical Fresnel lens as claimed in claim 12, wherein the manufacturing of the second sheet is same as that of the first sheet.

15. The method for manufacturing spherical Fresnel lens as claimed in claim 1, wherein the first optical element and the second optical element are attached via an adhesive.

* * * * *